United States Patent [19]

Bowman

[11] Patent Number: 5,746,302

[45] Date of Patent: May 5, 1998

[54] APPARATUS FOR CLEANING CONVEYORS

[76] Inventor: John H. Bowman, 9740 S. Meade Ave., Oak Lawn, Ill. 60453

[21] Appl. No.: 627,736

[22] Filed: Apr. 2, 1996

[51] Int. Cl.$^6$ .................................................. B65G 45/00
[52] U.S. Cl. ........................ 198/496; 15/256.5; 198/497
[58] Field of Search .......................... 15/256.5; 198/496, 198/497

[56] References Cited

U.S. PATENT DOCUMENTS

| | | | |
|---|---|---|---|
| 554,912 | 2/1896 | Derrenberger | 198/230 |
| 574,621 | 1/1897 | McCulloch et al. | |
| 575,520 | 1/1897 | Grupelli | |
| 936,297 | 10/1909 | Bowen | 198/496 X |
| 1,111,752 | 9/1914 | Lichtenstein et al. | 198/229 |
| 1,255,977 | 2/1918 | Bemis, Sr. | 198/230 |
| 1,883,223 | 10/1932 | Wood | |
| 1,942,590 | 1/1934 | Binger | 198/231 |
| 2,083,864 | 6/1937 | Puckett | 198/230 |
| 2,295,798 | 9/1942 | McKinley | 15/246 |
| 2,491,401 | 12/1949 | Tucker et al. | 198/230 |
| 2,804,194 | 8/1957 | Carlson et al. | 198/230 |
| 2,825,996 | 5/1958 | Davidts | 198/497 |
| 2,885,069 | 5/1959 | Bowen | 198/496 X |
| 2,915,019 | 12/1959 | Tieman | 104/279 |
| 3,229,808 | 1/1966 | Olson | 198/229 |
| 3,434,273 | 3/1969 | Lovell | 57/56 |

(List continued on next page.)

FOREIGN PATENT DOCUMENTS

| | | | |
|---|---|---|---|
| 0 448 080 A1 | 9/1991 | European Pat. Off. | 45/24 |
| 673721 | 3/1939 | Germany | |
| 11285 | of 1897 | United Kingdom | 474/92 |
| 11606 | of 1897 | United Kingdom | 474/92 |
| 24334 | of 1898 | United Kingdom | 474/92 |
| 765866 | 1/1957 | United Kingdom | 19/35 |

OTHER PUBLICATIONS

Drawings from application 08/190,318.
Drawings from application 08/190,311.
Industrial Finishing, Part II, Equipment, pp. 5, 56, Nov. 1984.
Brochure, Who Makes A Better Cleaner? No One!, Airogap Company (6 pp.).
Brochure, Typical Installation In A Major Midwest Manufacturing Company, Airogap Company (4 pp.), #1.
Brochure, Typical Installation In A Major Midwest Manufacturing Company, Airogap Company (4 pp.), #2.
Where should you look to remedy poor grounding, excessive overspray, over–deposition and fallout problems from dirt–tube buildup? No higher than your conveyor . . . and no wider than Airogap! (1 p.).
Airogap Company, *We are proud to introduce* Enclosed Track Power and Free Cleaners and price sheet (2 pp.).
*We are proud to introduce the* Dyan Enclosed Track Power And Free Cleaners and price sheet (2 pp.).

*Primary Examiner*—Janice L. Krizek
*Attorney, Agent, or Firm*—Leydig, Voit & Mayer, Ltd.

[57] ABSTRACT

Conveyor cleaning assemblies are disclosed for cleaning endless conveyors such as for conveyor belts or chains. Each assembly includes a cleaning head which carries brushes for engaging one or more adjacent surfaces of the conveyor and a head support for holding the cleaning head in a fixed position adjacent a predetermined portion of the conveyor path. The cleaning head is engaged on the head support by sliding engagement movement in a direction generally parallel to the direction of movement of the conveyor that is contacted by the cleaning head, with the cleaning head and the head support having abutment stops to limit this engagement movement. Accordingly, the friction forces of the conveyor hold the cleaning head in position on the support without requiring any further attachment devices. In one embodiment, a cleaning head with brushes and a scraper is so mounted for cleaning a conveyor belt. In other embodiments cleaning heads with brushes are so mounted on opposites sides of large conveyor chains.

32 Claims, 6 Drawing Sheets

U.S. PATENT DOCUMENTS

| | | | |
|---|---|---|---|
| 3,643,785 | 2/1972 | Bostedt | 198/75 |
| 3,819,032 | 6/1974 | Preuss et al. | 198/180 |
| 3,858,715 | 1/1975 | Brock et al. | 198/229 |
| 3,935,610 | 2/1976 | Vogt | 15/21 R |
| 4,091,492 | 5/1978 | Thomson et al. | 15/246 |
| 4,176,429 | 12/1979 | Rottensteiner | 26/93 |
| 4,257,517 | 3/1981 | MacPherson et al. | 198/497 |
| 4,416,367 | 11/1983 | Easton et al. | 198/496 |
| 4,514,872 | 5/1985 | Hopkins | 15/256.5 |
| 4,678,075 | 7/1987 | Bowman, Jr. | 198/496 |
| 4,787,500 | 11/1988 | Holz | 198/497 |
| 4,960,200 | 10/1990 | Pierce | 198/495 |
| 5,333,724 | 8/1994 | Wingfield et al. | 198/495 |

APPARATUS FOR CLEANING CONVEYORS

This invention relates to apparatus and methods for cleaning of endless conveyors. More particularly, this invention pertains to the mounting of brushes for cleaning of moving conveyors, for example in cleaning of conveyor belts such as are used in the food industry and in cleaning of conveyor chains of the types used to move parts, carts and assemblies in manufacturing, assembling or painting operations.

BACKGROUND OF THE INVENTION

Conveyors are widely used for conveying a variety of products, including discrete items or assemblies as well as bulk materials. In many instances some of the materials coming in contact with the conveyor will cling or adhere thereto. These materials may include product fines or trimmings, excess product, excess finishing materials, or extraneous materials from other sources such as accumulations of lubricants or dirt, and may include adherent liquids such as paints. All such materials are encompassed by the term "debris" hereinafter. The retention or accumulation of such debris on the conveyor usually is undesirable or unacceptable. Accordingly, removal is desirable or necessary as a condition of continued operations or to enhance efficiency of continued operations and may require periodic shut-down of the operation of the system for cleaning purposes.

Examples of such conveyance operations occur in food manufacture, e.g. in the manufacture of foods and/or other products. Such products also may include surface additives such as condiments, e.g. salt, sugar, oils, frosting or the like. In such processes, crumbs or other fragments of the food product and/or some of the additives often separate from the desired discrete final products or are deliberately separated such as in stamping or "cookie cutting" discrete products from a sheet of basic material such as a sheet of dough. In any event, it may be desirable to recover the separated debris for reuse or it may become undesirable debris and may even be considered a "contaminant". Other examples occur in the instance of flexible conveyor chains used in manufacturing, assembling or painting operations. Dirt, paint, lubricants such as grease and oil, by themselves or more usually in combination with other debris, or other debris may accumulate on such chains and on the pusher dogs, latches or carriers which often are included in or on such chains. Thus, in a variety of instances debris may adhere to and accumulate on a conveyor incidentally or inherently during its operation in accordance with its intended use.

The problem of adherence and accumulation of debris typically is enhanced when the product being handled or the environment of use exposes the conveyor to oils, food toppings, lubricants, paints or other adherent materials. Also, the cleaning requirements and problems referred to above are enhanced when dealing with food products because of the need to avoid contamination of the end products as well as to minimize or avoid the inclusion of product crumbs or fragments in the packages of the end product. Governmental regulations and desirable operating practices also typically require periodic complete washing and/or steam cleaning of equipment which contacts food products during production, with dismantling of relevant processing mechanisms for such cleaning.

Many previous efforts to clean conveyors have involved considerable hand labor and/or shut-down of the conveyor line for general cleaning purposes.

It is an object of this invention to provide improved apparatus for cleaning endless conveyors.

It is another object of this invention to provide improved apparatus and methods for continuous cleaning of endless conveyors while in operation.

It is a further object of this invention to provide for easy and quick insertion, removal and replacement of conveyor cleaning heads in such conveyor cleaning apparatus.

SUMMARY OF THE INVENTION

The present invention provides for mounting a conveyor cleaning head in a predetermined cleaning position on a support head, adjacent the conveyor, by sliding the cleaning head generally in the direction of movement of the contacting portion of the conveyor. An abutment stop on the cleaning head seats against the support head to limit the engagement movement. The frictional engagement of the moving conveyor with the cleaning elements tends to move the cleaning head into its assembled and seated cleaning position, and holds it in its assembled cleaning position, whereby further attachment or securement devices are not necessary. The cleaning head may be removed for cleaning, replacement or the like simply by sliding it in the opposite direction, without requiring tools and with minimal or no downtime in the use of the conveyor.

The disclosed embodiments include one or more brushes to be positioned in contact with the respective conveyor. In the embodiment preferred for cleaning conveyor belts, the cleaning head also includes a scraper blade ahead of the brushes. It has been found that such a scraper removes the majority of debris that might otherwise be retained on the belt. The brushes are provided downstream, behind the scraper, with the tips of the bristles generally co-planar with the scraper edge for removing debris that might remain after the respective portion of the belt has passed the scraper. For cleaning a rubberized canvas belt such as often is used in the food industry, it is suggested that three such brushes be included in series, each being spaced from the other. The individual brushes are snap-mounted in the cleaning head for ease of removal and for easy replacement of the individual brushes.

Multiple cleaning heads according to this invention may be used together or separately for cleaning a single conveyor. The mounting plane of each cleaning head preferably is parallel to the conveyor surface which it is to clean as the conveyor moves through the cleaning station in contact with the cleaning elements. Each such cleaning head may be oriented with its major plane vertical, horizontal or at other orientations.

For cleaning conveyor chains the cleaning elements on the head are brushes. Preferably these are elongated brush sets each arranged with its longitudinal axis generally parallel to the direction of movement of the chain and with its bristles substantially perpendicular to the chain as it passes therealong. In a preferred embodiment for cleaning large conveyor chains, multiple such brushes are so mounted on each of separate cleaning heads provided on each side of the chain.

Other objects and advantages of the invention will become apparent upon consideration of the following detailed description and appended claims, and upon reference to the accompanying drawings.

DETAILED DESCRIPTION OF EMBODIMENTS OF THE INVENTION

Referring to the enclosed drawings, there is illustrated a conveyor apparatus 20 which includes a broad flat endless conveyor belt 22 that is trained and traverses around a pair of horizontally spaced support rollers (one of which is illustrated at 24) such that the upper run 22A of the belt extends generally horizontally. One of the rollers typically is driven to drive the conveyor and the other is an idler. The conveyor assembly 20 is suitably supported by an appropriate framework to support the entire mechanism in the desired position, and may be of any appropriate length, with intervening support rollers or guides for the belt 22. Edge support rollers also may be provided to raise the edges of the belt along the conveyance run 22A to provide a concave upper conveyance surface, as will be apparent to those skilled in the art. The conveyor 20 is intended to receive products from some appropriate input source, and to carry those products along a portion of the length of its upper run 22A, normally to be discharged therefrom at one end such as by dropping them onto another conveyor 30 adjacent the end roller 24 or into a receptacle. The support framework includes at least one pair of parallel support bars 34 along opposite sides of the conveyor. A pan or hopper 36 or other receptacle is positioned beneath the discharge end of the conveyor belt 22 and beneath a subjacent cleaning assembly 40 to receive debris dropped or dislodged from the belt 20, as described further below.

Figure 1:
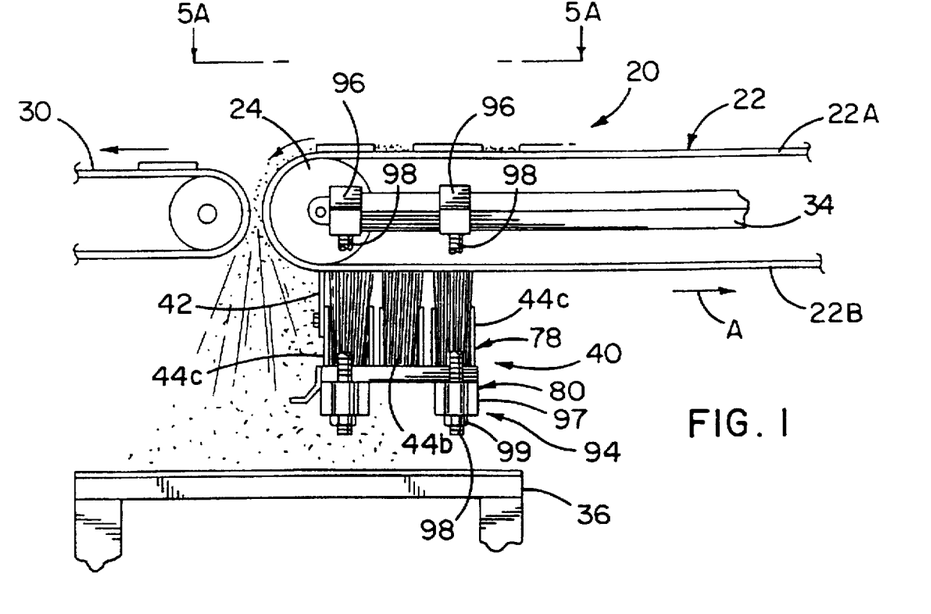
FIG. 1 is a partly schematic side view of components of a conveyor belt system with a cleaning assembly employing teachings of this invention, with some of the support and hanger parts broken away or omitted.

The belt cleaning assembly 40 illustrated in FIG. 1 is positioned for cleaning the outside surface of the belt along the return run 22B. In the illustrated system 20, the belt support roller 24 holds the belt flat in the area over the cleaner portion to insure that the belt remains in relatively uniform contact with the cleaner across the full width of the belt and over the length of the belt's contact with the cleaning unit. In the event a cleaning unit 40 or the like is positioned against a portion of the belt remote from an end roller such as roller 24, additional support rollers may be included at appropriate positions generally opposite the cleaning unit and especially opposite the lead scraper blades 42 thereof.

Referring now to FIGS. 1–4, the cleaning unit 40 includes a scraper blade 42 and three brushes 44a, 44b and 44c, with the blade 42 being on the leading side of the brushes. As used herein the term "leading side" or "leading edge" shall mean that side or edge which is first passed by the adjacent portion of the belt in the normal conveying movement of the belt, e.g., the left side of cleaner 40 in FIGS. 1 and 2 and wherein it is assumed that the belt 22 is moving in the direction indicated by the arrows A. Similarly, the term "trailing side" or "trailing edge" refers to an end or portion which is downstream in the direction of normal belt movement, e.g., to the right in FIGS. 1 and 2.

The brushes are spaced from one another in a direction longitudinally of the belt 22. Each of the scraper and brushes extends across the width of the belt, being disposed generally normal to the axis of movement of the belt and parallel to one another. The bristles 46 of the brushes are relatively long to provide flexibility and avoid undue wear of the belt as it moves in running contact with their outer ends. The compressibility of the bristles may be enhanced to further minimize wear of the belt by using bristle fibers which are crimped normal to their axes. Each brush 44 is mounted between a pair of parallel side support walls 48 which extend over a substantial portion of the height (length) of the bristles 46 to provide lateral support to outer portions of the brush bristles while allowing space between the walls for flexing of the individual bristles during the cleaning operations. In the illustrated embodiment 40, the blade 42 is adjustably affixed to the leading side of the leading support wall 48L, for vertical adjustment, toward and away from the belt 22. Aligned slots 50 in blade 42 and slots 52 in wall 48L receive securement bolts 54 which project through the wall 48L and the blade 42. Fasteners such as nuts 56 on the threaded bolts 54 permit adjusting the blade 42 vertically to its operative position in contact with the outer surface of the belt and then clamping the blade in this desired operative position.

Figure 2:
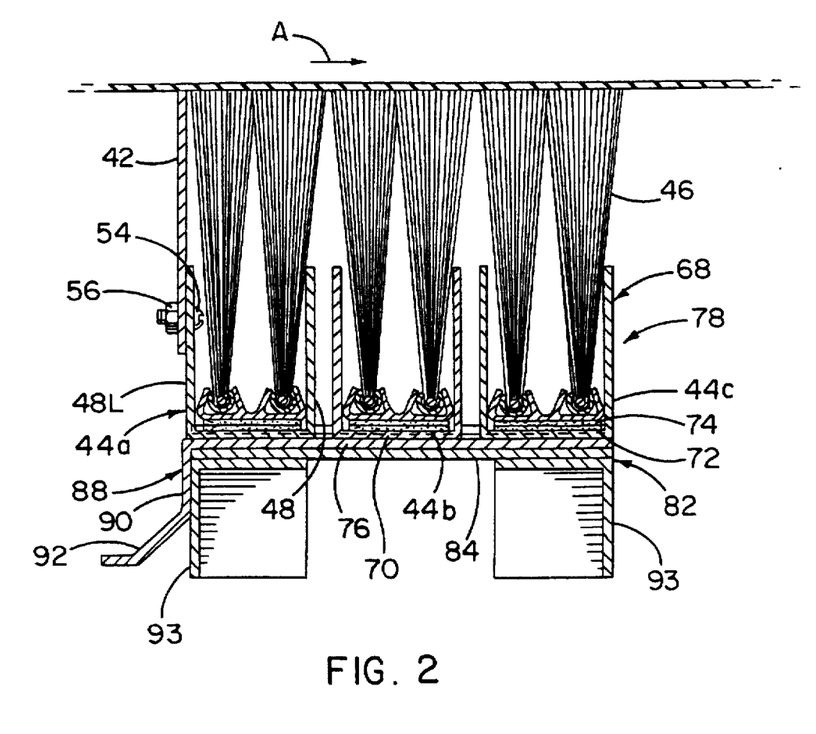
FIG. 2 is an enlarged vertical longitudinal sectional view of the cleaning assembly of FIG. 1 relative to the conveyor belt, being taken in a plane parallel to the plane of FIG. 1.
Figure 2A:
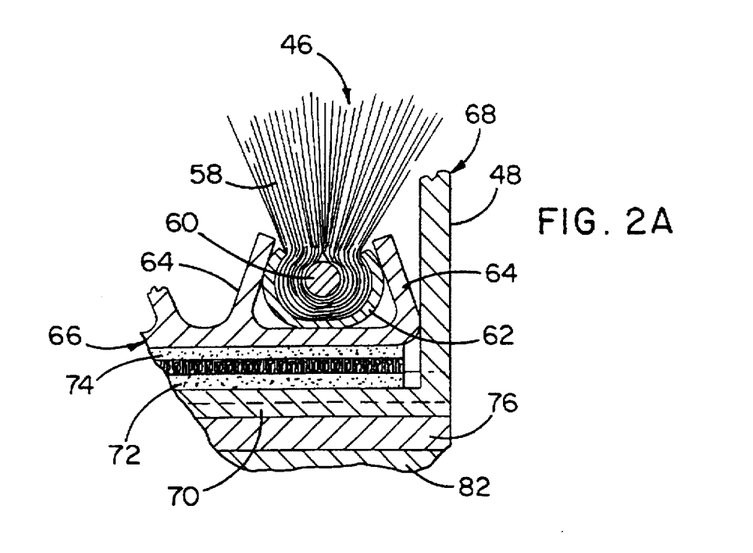
FIG. 2A is an enlarged view of a portion of FIG. 2.
Figure 3:
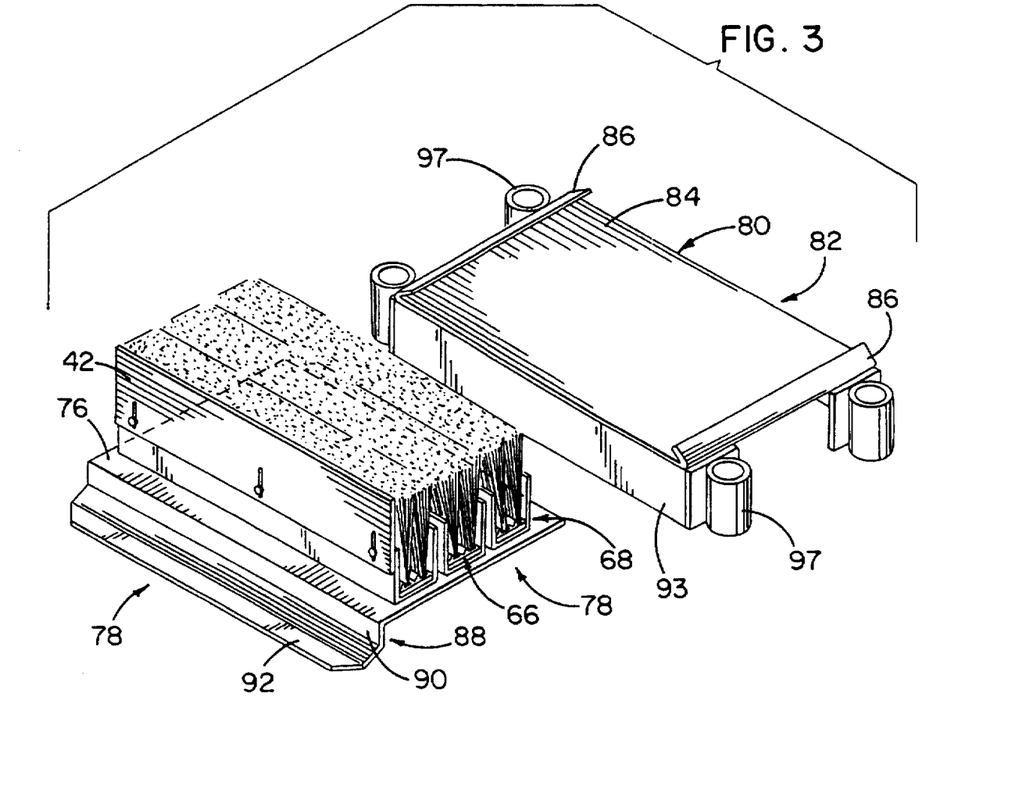
FIG. 3 is a front perspective view of the cleaning head and head support of the assembly of FIG. 1.
Figure 4:
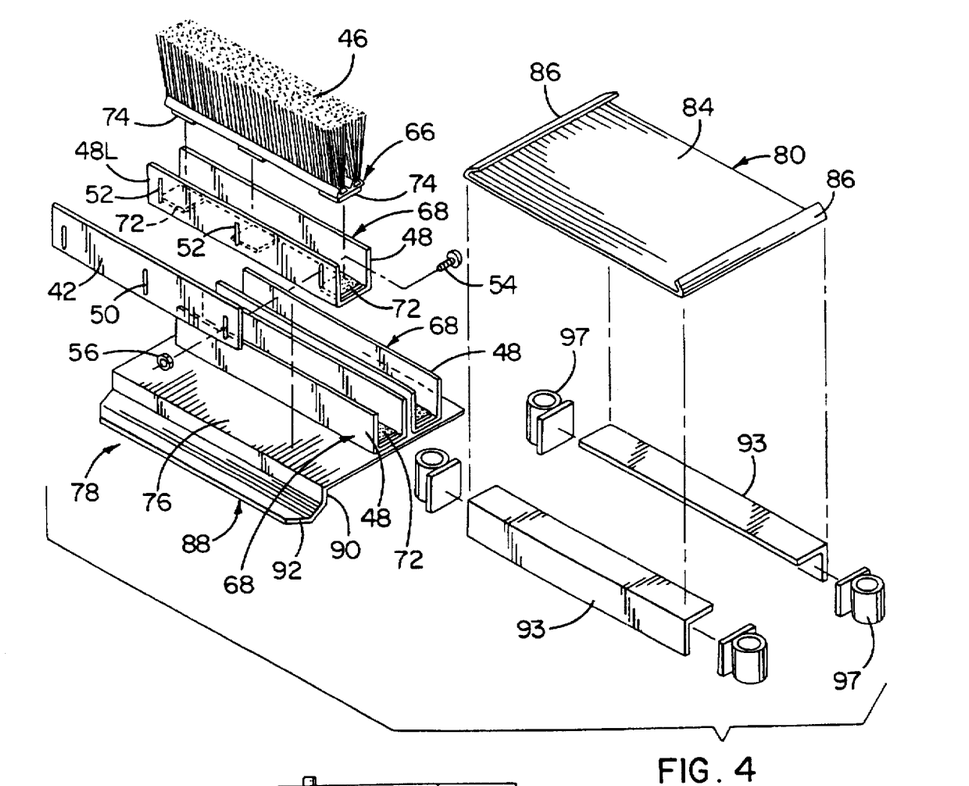
FIG. 4 is an exploded perspective view of the components as in FIG. 3, omitting two of the brush subassemblies.

In the illustrated embodiment, each of the brushes 44 comprises two parallel brush subassemblies each formed by an elongated row of U-shaped strands 58 with their bights passing about a center rod 60 and clamped in a U-shaped base 62. The base of each brush subassembly is secured between opposed sets of ribs 64 of an extruded metal base holder strip 66, see also FIG. 2A. Further, each set of walls 48 are generally parallel legs of a U-shaped channel member 68 which includes a base leg 70 joining the respective upstanding support legs 48. Each brush 44 is removably secured in place in the respective channel 68 by an appropriate detachable latching means, e.g. by sections 72 of attachment material adhered to the inner surface of base leg 70 and mating attachment sections 74 adhered to the bottom surface of the base holder strip 66. One example of an appropriate securing mechanism is short sections of Dual Lock® adhesive-backed fastening tape currently marketed by Minneapolis Mining and Manufacturing Company of St. Paul, Minn., which tape has fields of mushroom-shaped plastic heads that interlock when pressed together; see also FIG. 2A.

All of the support channels 68 are affixed to a base plate 76, as by welding thereto, to form a cleaning head assembly 78 which includes the scraper 42 and the brushes 44. The base plate 76 is slidably received and retained within a shallow U-shaped retainer plate 80 of a support structure 82. The retainer 80 includes a base 84 and opposed converging edge flanges or lips 86 for sliding retentive engagement over the opposite lateral edges of the base plate 76 to slidably retain the brush and scraper assembly in position on the support head structure 82. The base plate 76 includes a downwardly extending flange 88 at its forward end. The flange 88 includes a front portion 90 that abuts the leading edge of the support head structure 82 to serve as a stop that limits the sliding seating engagement movement of the cleaning head 78 onto the support head 82. A gripping flange portion 92 extends downward and forward from portion 90 and serves as a handle or grip for a person to grasp and remove the cleaning head assembly 78 such as for cleaning or replacement purposes.

The support head structure 82 includes a pair of angle iron support bars 93 secured to the plate 80, as by welding This support head assembly is supported adjacent the belt 22 by an adjustable hanger means 94 for adjustably supporting the unit 40 in the appropriate position beneath the belt run 22B. In the illustrated embodiment of FIGS. 1–4, the hanger means 94 includes brackets 96 for engaging the bars 34 and threaded hanger rods 98 which pass through sleeves 97 affixed to each end of the supports 93. Nuts 99 adjustably secure the supports to the rods 98.

The support head structure 82 is disposed and mounted in a manner whereby the retainer plate 80 is oriented with the retainer flanges 86 extending generally parallel to the direction of movement of the adjacent portion 22B of the conveyor belt being cleaned. Further the cleaning head slidably engages onto the support head structure ·82 in this same direction of movement, with the tips of the brushes 44 in frictional brushing engagement with the adjacent surface of the belt. The scraper blade 42 also is adjusted to engage the belt surface in a similar manner. While the belt is moving in its normal conveyance manner, the frictional engagement of the adjacent portion of the belt with the brush and scraper cleaning components applies transverse forces to the cleaning head in the direction of movement of this portion of the belt. Those forces tend to move the cleaning head into its fully seated position wherein the flange component 90 abuts the subjacent support head structure. This interaction maintains the cleaning head in its fully seated operational position, with no additional securement or retention devices such as bolts, pins or the like being required to secure the cleaning head in its operational cleaning position. Accordingly, the cleaning head may be removed simply by sliding the head in an opposite direction, i.e., generally opposite to the direction of movement of the adjacent belt portion. In the illustrated preferred embodiment such removal may be effected by grasping and pulling on the exposed gripping flange portion 92.

Debris which is dropped from the discharge end of the belt as well as that which is dislodged from the outer belt surface by the scraper 42 drops by gravity directly into the hopper 36 for retention and/or removal in any conventional manner, except for such materials as are retained on or entrapped within the cleaning mechanism. In the operation of the cleaner 40, the scraper 42 usually removes most of the debris material which has not fallen freely from the conveyor belt. Material removed by the brushes tends first to accumulate in the brushes or in the spaces between the brush housings with possible overrun into the hopper 36 from the sides of the head 78. In addition, openings may be provided through the structure, between the brushes, to permit debris materials to fall directly therethrough into the hopper 36 or a similar receptacle. Material remaining in the cleaner head is removed during the periodic cleaning of the cleaner components, as referred to further below.

In many installations, and particularly in the food industry, frequent removal and thorough cleaning of the cleaner units is required. To effect removal of cleaning unit 40, the cleaning personnel or operator need only slide the entire cleaning head assembly out of the unit, from between the support structure and the adjacent belt. It will be appreciated that this involves a relatively simple removal of only the cleaning head components, without need to unlatch or remove any holding device.

The down-time of the system may be minimized by having another corresponding cleaning head at hand for prompt replacement for the removed head by the simple slide-in technique permitted by the aforedescribed design. Appropriate cleaning of the support structure may be carried out before reinsertion of a head, as by wiping and/or washing same as necessary to the type of operation being conducted. In food operations typically it is necessary to periodically steam-clean or otherwise carry out particular cleaning operations on the cleaning head itself. With the described design, the cleaning heads are readily removable for carrying out these special cleaning operations at another site, and at another time. These removal, cleaning and replacement operations can be effected without use of any tools.

The preferred embodiments illustrated and described above are especially desirable for use in the food industry where frequent thorough cleaning is required. For such uses, the components exposed to the products being handled may be fabricated of non-porous stainless steel (e.g., 300 S.S.), with the bristles 46 and the endcaps of the rollers being polypropylene. In the illustrated embodiment, the belt 22 is deemed to be of the type comprising a continuous web forming an imperforate planar support surface, such as a rubber belt or a rubberized canvas belt of the type commonly utilized in the food industry. A particular example of appropriate natural polypropylene bristles for cleaning such a rubberized canvas belt are to provide brushes with crimped bristles 46 about 4" long and 0.030" in diameter. The dual holder strip 66 is about 1⅝" wide. The side walls of each channel 48 are spaced from one another about 1¾", with adjacent channels 48 being spaced from one another about ½". The distal edges of the side walls 48 are below the plane defined by the ends of the upstanding bristles, e.g. about 1½"–2" in the noted example. The scraping edge of the scraper 42 is substantially co-planar with the ends of the bristles. The scraper also preferably is of metal, such as stainless steel, to minimize wear at the contact edge.

Figure 5A:
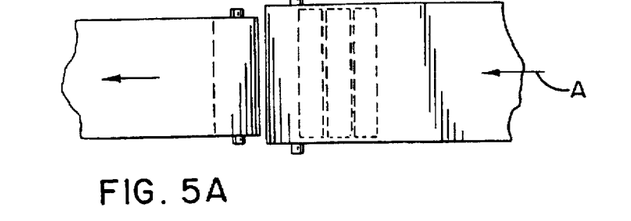
FIG. 5A is a schematic view of the conveyor portions of FIG. 1, illustrating the position and orientation of the cleaning assembly in phantom lines.
Figure 5B:
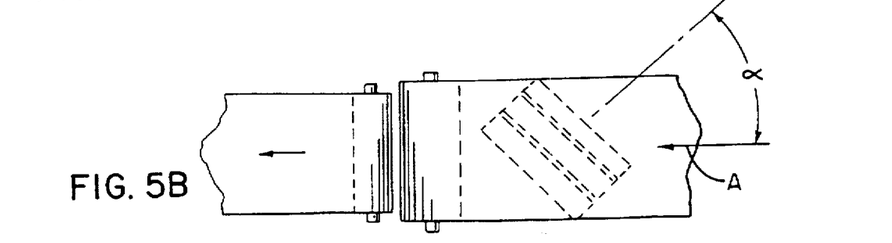
FIG. 5B is a view similar to FIG. 5A and illustrating a modified arrangement of a cleaning assembly.
Figures 6, 7:
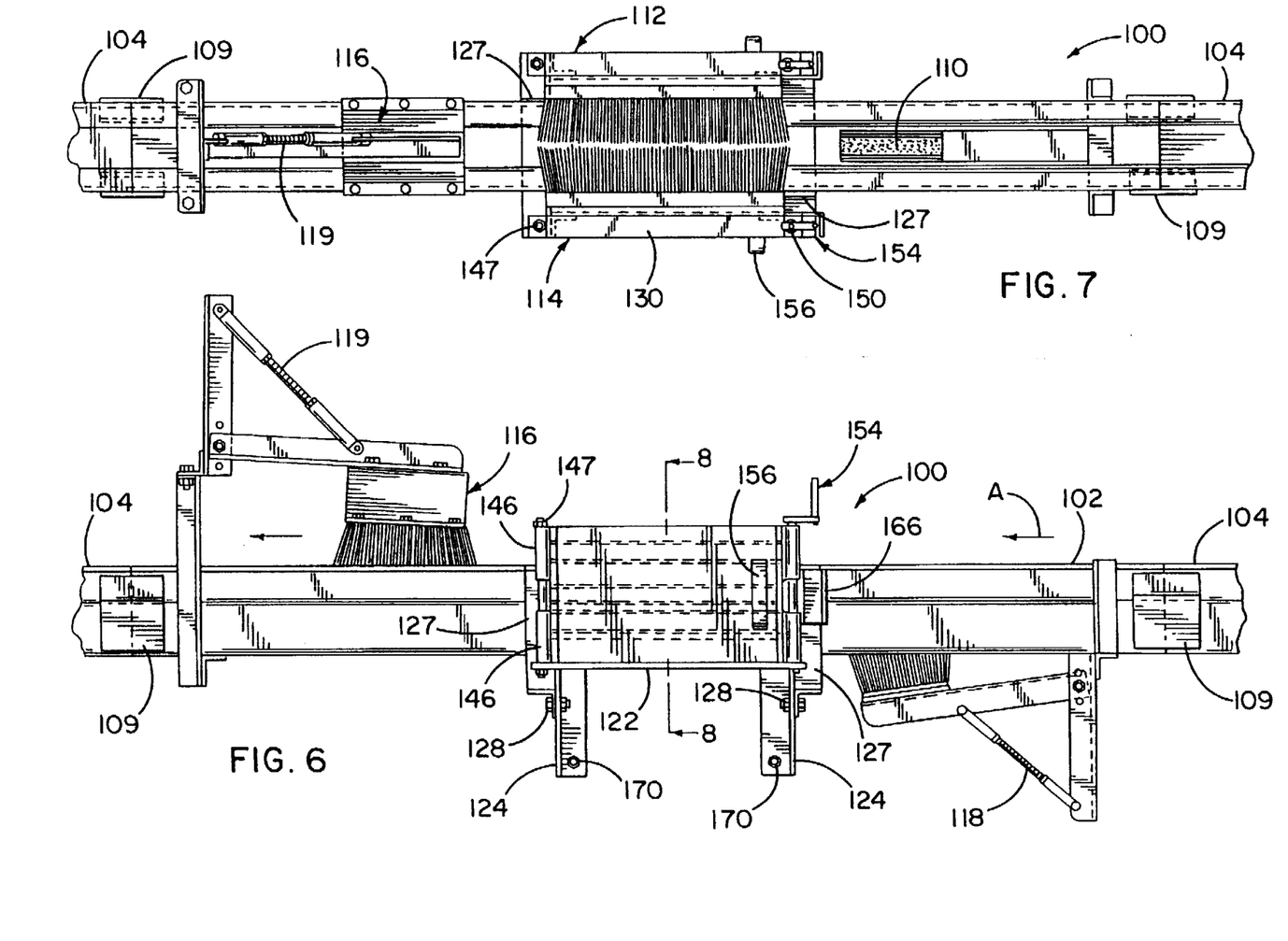
FIG. 6 is a side view of another conveyor cleaning assembly employing teachings of this invention in cleaning a conveyor chain.
FIG. 7 is a top view of the assembly of FIG. 6.
Figure 8:
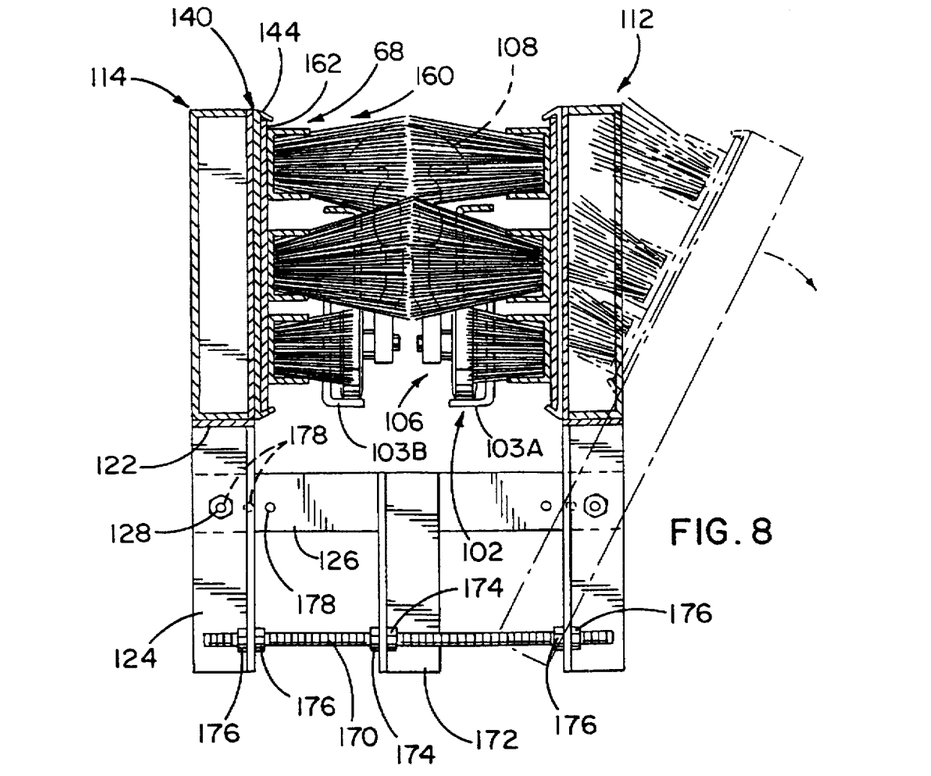
FIG. 8 is a sectional view taken generally along line 8—8 of FIG. 6.
Figure 9:
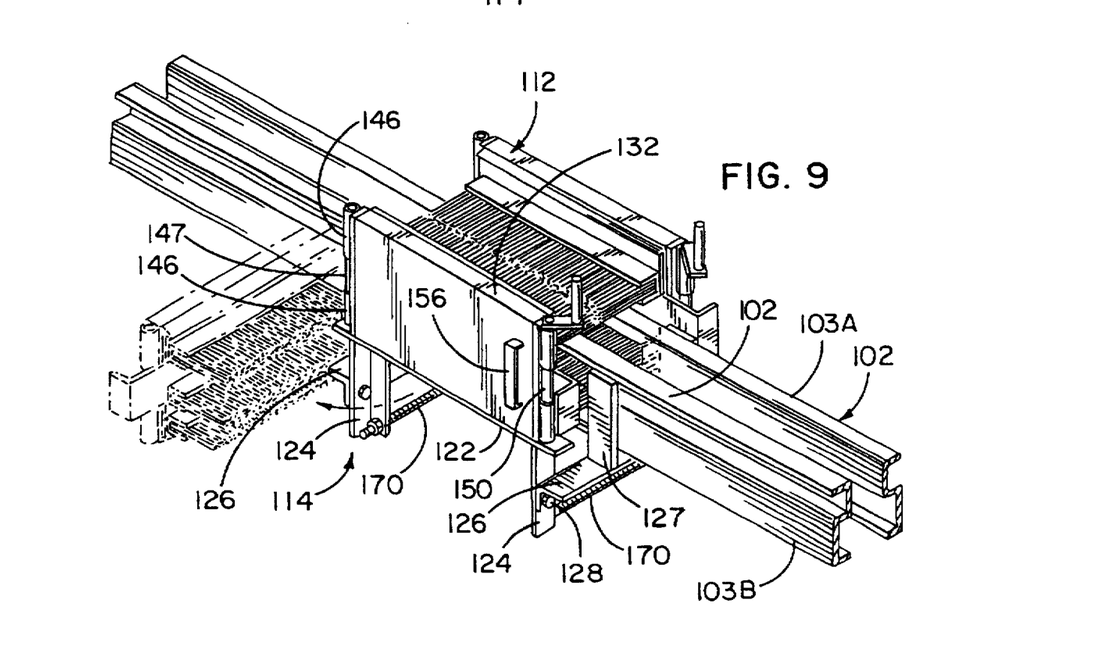
FIGS. 9 and 10 are a perspective view and an exploded perspective view, respectively, of the side cleaning assemblies of FIG. 6.

It will be appreciated that various aspects of the preferred embodiment illustrated and described above may be varied in other installations. For example, the support head structure and cleaning head assembly may be oriented with the slide-axis of assembly and disassembly at various angles α of up to about 45° to the direction of movement of the adjacent portion of the belt contacted by the cleaning elements, as illustrated in FIG. 5B. While the parallel arrangement of FIGS. 1–5 presently is preferred, it is believed that substantially the same modes of assembly and operation can be obtained within approximately this angular range. More or less sets of brushes 44 may be included, though three sets is preferred for the aforedescribed application, and the spacing therebetween may be varied, as may be the length of the bristles. It is believed that brushes with bristles about 2½" to about 7" long will be effective for cleaning food product conveyors. Also, the scraper may be spaced from the leading brush in other installations, and may be mounted other than directly on the support of the leading brush unit. Other support and fastening devices may be utilized for supporting the various components.

The aforedescribed cleaners may be used singly, where cleaning of only one side of a conveyor is desired, or with another such cleaner for cleaning both sides of the same conveyor as referred to further below. Also, if a belt conveyor is of foraminous material or otherwise has sufficient openings therethrough, a cleaner similar to the conveyor 40 may be mounted atop the belt and drop the debris material through the conveyor directly into a hopper or receptacle similar to hopper 36 directly therebeneath.

Cleaners employing teachings of this invention may be utilized on various types of conveyor belts, including for example metal belts of wire mesh or hinged metal plates and on other types of conveyors, such as in cleaning of conveyor chains. An embodiment of a conveyor cleaning assembly for such cleaning of conveyor chains is illustrated in FIGS. 6–10. Such cleaning assemblies for conveyor chains are illustrated in greater detail in my copending application entitled "Apparatus For Cleaning of Conveyors" filed concurrently herewith as Ser. No. 08/626,354. The disclosure of that application is incorporated herein by reference.

In general, the conveyor cleaning assembly 100 illustrated in FIGS. 6–10 includes a short length of a box rail 102 for interposition in a long box rail 104 such as is installed in many manufacturing plants. Such a box rail typically carries an endless conveyor chain of the type that includes a series of trolley elements 106 which are linked to one another in an endless series. Such a trolley element is illustrated in the box rail 102, in end view, in FIG. 8. Certain of these trolleys or the intervening chain links carry latch heads or pusher heads at spaced intervals along the chain for carrying individual parts or pallets or to serve as pushers or pullers for carts or subassemblies that may be propelled by the chain 106. One such head 108 on a trolley 106 is seen in phantom within the upper brush in FIG. 8. Such a chain is illustrated more fully in my aforementioned copending application, and such chains are well known in the art of chain conveyors. The channel section 102 conforms in cross section to the main conveyor channel 104 except that major portions of the bottom wall preferably are omitted, either by cutting away the bottom wall in various areas or by forming the length of rail channel 102 from two spaced side portions 103A and 103B. The purpose is to provide adequate open space for much of the debris which is removed from the chain by the cleaning assembly to fall through the bottom of the channel. The channel section which carries the cleaning components may be interposed in a conveyor system by removing a section of the rail 104 of a corresponding length and inserting the section 102, such as by use of weld plates 109.

The cleaning assembly 100 includes four sets of cleaning brushes, namely a bottom brush 110, two opposing side cleaning brush assemblies 112 and 114, and a top cleaning brush 116. The bottom brush 110 is a single brush element which protrudes upward through the open bottom of the rail section 102 for cleaning generally the lower portions of the trolleys and the related chain links. The upper brush assembly 116 comprises three brushes, including a center brush oriented with its bristles extending essentially vertically downward and two converging side brushes for cleaning the tow lugs 108 and top structures of the trolleys and links, as described and discussed more fully in my aforementioned copending application. The bottom and top brushes 110 and 116 are pivotally mounted for generally vertical adjustment by devised turnbuckles 118 and 119 similar to the mounting shown and described in my U.S. Pat. No. 4,678,075, which also is incorporated herein by reference, and as described in greater detail in my aforementioned copending application.

In each of the side brush assemblies 112, 114, the brushes are mounted by slide engagement of cleaning head assemblies on support head structures in a manner generally similar to the mounting arrangement described above with respect to the cleaning assembly 40. However, the assemblies 112 and 114 are oriented in vertical planes, with additional provisions for the mounting and adjustability of the support structures and hence of the supported cleaning heads. An assembly 114 is described hereinafter in some detail, it being understood that the assembly 112 is a mirror image thereof.

The assembly 114 includes a subframe 120 that is pivotally mounted on the rail 102 for pivotal movement about a longitudinal axis that is parallel to the longitudinal axis of the rail. To this end, each subframe 120 includes a horizontal plate 122 that is affixed to the upper ends of two short vertical angle iron legs 124, as by welding. These vertical legs 124 are pivotally mounted on a transverse angle-iron bracket 126 that is affixed to a vertical support plate 127 which is affixed to the adjacent side of the rail 102, as by welding in each instance. This pivotal mounting is effected by a pair of axially aligned pivot bolts 128 which extend through the respective legs 124 and bracket 126, as illustrated, and which thereby define the horizontal pivot axis of the subframe 120 and thus of the assembly 114.

A support head 130, which is oriented generally in a vertical plane, is pivotally mounted at one end on the plate 122. The illustrated support head 130 comprises a generally rectangular welded subassembly comprising a framework 132 formed of angle irons to which is welded a retainer plate 140. The retainer plate includes a planar base plate 142 with opposed converging edge flanges or lips 144, similar to the retainer plate 80 referred to above. The framework 130 also includes a pair of aligned sleeves 146 at its trailing end. A pivot rod 147 extends through these sleeves and through the plate 122 for pivotally supporting the support head 130, and thereby the cleaning head assembly 114, about a generally vertical axis between the closed operative position of FIGS. 6, 7, 8 and also shown in solid lines in FIG. 9, and an open position as illustrated in phantom lines in FIG. 9 as well as in solid lines in FIG. 10. A similar pair of sleeves 148 secured to the leading edge of the support 130 receive a vertical securement bolt 150 for selective threaded engagement with an opening 152 in the opposite end of the plate 122. The bolt 150 preferably includes a crank arm 154 or the like at its upper end for convenient manual engagement and disengagement of the bolt 150 with the plate 122 when the support 130 is in its closed position. A handle 156 is provided on the outer side of support head 130 near its leading edge to facilitate gripping and manual swinging of the assembly 114 between its closed and open positions.

Figure 10:
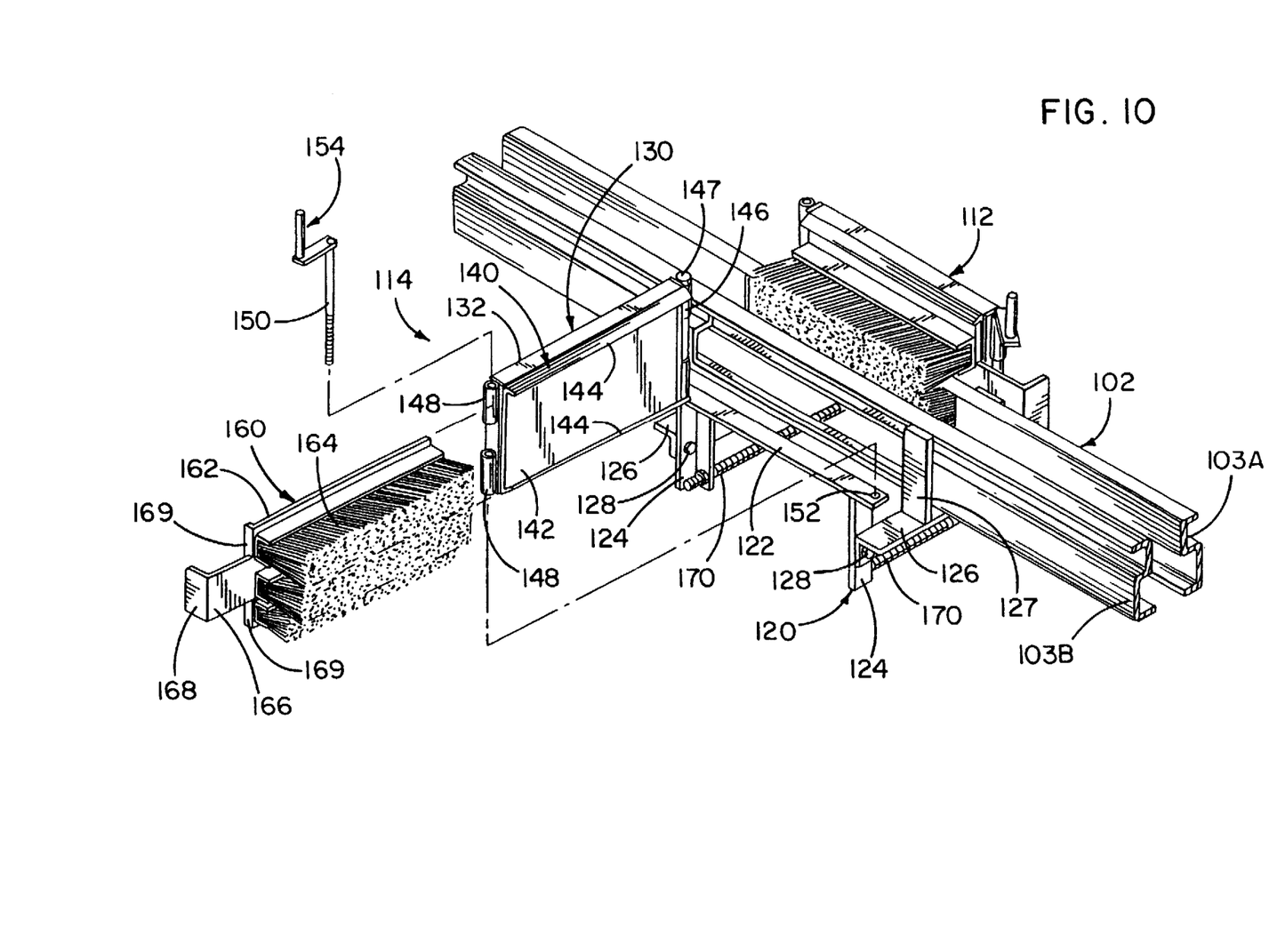

The assembly 114 further comprises a cleaning head assembly 160 that includes a base plate 162. Three sets of brushes 164 are mounted on the plate 162 in substantially the same manner as described above in respect to the mounting of the brushes 44 on plate 76 except that the brushes 164 are oriented generally parallel to the direction of engagement of the cleaning head 160 into the support head 130. An L-shaped extension 166 is provided at the leading edge of the plate 162 to provide a laterally extending gripping flange 168 which is spaced from the adjacent elements of the assembly 114 to permit ready grasping by an operator for removal and/or replacement of a cleaning head assembly 160 on the support structure 130. Flanges 169 on the leading edge of the plate 162 provide abutment stops against the leading edge of the support head 130 to limit the sliding seating engagement movement of the cleaning head 160 onto the support head 130. It will be appreciated that the pivoting of the support head 130 for swinging between its closed operative position and the open position illustrated in phantom in FIG. 9 as well as in FIG. 10 provides ready access for removal and replacement of the cleaning head assembly free of interference with other components of the cleaning assembly 100 as well as from engagement with the chain and related mechanism within the channel 102.

Tilting of the assembly 114 about the horizontal axis defined by bolts 128 is effected by threaded rods 170 which extend through the depending legs 124. The rods 170 are secured to a stationary bracket 172 beneath the rail 102 by nuts 174; see FIG. 8. Nuts 176 adjustably affix each leg 124 to the respective rod 170. The lateral tilting adjustment provided by the legs 124, pivot bolts 128, threaded rods 170 and adjustment nuts 174, 176 afford convenient fine adjustment of the lateral positions of the support heads 130 and thus of the brushes 164 when the support and cleaning heads are in their closed operative positions for cleaning a conveyor chain and related structure as the latter moves along the channel section 102. Multiple laterally spaced holes 178 may be provided through the bracket 126 for each pivot bolt 128 to provide gross lateral adjustment of support head 130, such as for basic adjustment for use of cleaning heads with brush bristles of different lengths either by virtue of the specific brushes being used or to provide general adjustment as the bristles wear to shorter lengths.

Brushes with bristles of various materials may be used, such as of metal or aluminum oxide, particularly for cleaning metal belts and chains, except perhaps in the food industry where it is believed that polypropylene is required by regulation and except where the belts are of fabric or other materials which will be unduly worn or frayed by metal bristle brushes. Straight bristles of about 0.014" diameter oil tempered steel wire presently are preferred for cleaning wet paint, for ease in cleaning of the brushes, and for basic cleaning of heavily encrusted chains. Aluminum oxide bristles of 40 to 100 grip, preferably about 80 grip, are preferred for routine cleaning of oil, grease, dirt, paint and the like and thus for maintenance and even polishing of chain conveyors. Bristles which are bent in a zig-zag or "crinkled" manner along their lengths are advantageous in many cleaning operations.

It will be seen that apparatus and methods for cleaning conveyors have been provided which meet the objects aforestated. While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A conveyor cleaning assembly for cleaning an endless conveyor as such conveyor moves in a predetermined direction along a portion of its path of movement, said cleaning assembly comprising:

a cleaning head which includes at least one cleaning element for engaging one or more surfaces of said conveyor and removing debris therefrom as said conveyor moves along said portion of its path in frictional engagement with said cleaning element, and a head support for holding said cleaning head in a fixed position adjacent said portion of said path, said head support having an engagement axis disposed generally parallel to said predetermined direction, means for supporting said head support in a predetermined position and relationship to such a conveyor with said engagement axis generally parallel to said predetermined direction, said cleaning head and said head support being of complementary configurations for sliding engagement of said cleaning head with said head support upon movement of said cleaning head along said engagement axis generally in said predetermined direction of movement of such conveyor, said head support precluding movement of said cleaning head laterally relative to said engagement axis of said head support when so engaged therewith, and said cleaning head and said head support including abutment portions which limit the sliding engagement movement of said cleaning head onto said head support in said direction of movement of said conveyor, whereby said cleaning head may be so slid onto said head support and into a cleaning position for contact with said conveyor and thereafter will be retained in such cleaning position by friction forces of said conveyor acting on said cleaning head as said conveyor moves in said predetermined direction while in contact with said cleaning head and said cleaning head may be removed by sliding movement thereof opposite to said predetermined direction.

2. The invention as in claim 1 which includes such a conveyor and a support frame for said conveyor, said head support being mounted on said support frame.

3. The invention as in claim 1 wherein said cleaning head includes a generally flat member for such sliding engagement with said head support, and said cleaning head includes a depending lip which abuts a portion of said head support.

4. The invention as in claim 1 wherein said head support defines a support plane and spaced lateral guides protruding from said plane, said cleaning head having sliding engagement on said support plane between said lateral guides.

5. The invention as in claim 1 wherein said head support includes a generally planar support member with lateral guide flanges, said cleaning head engaging said head support between said flanges.

6. The invention as in claim 1 wherein said head support includes spaced guide flanges each of which defines an inwardly open groove, portions of said cleaning head having a sliding engagement in said grooves whereby said cleaning head is retained on said head support.

7. The invention as in claim 1 wherein said head support includes a plate-like body with a guide flange extending along each lateral edge generally parallel to said engagement axis, and said cleaning head includes a plate-like body which fits between said guide flanges.

8. The invention as in claim 7 wherein said flanges extend inward over the respective side portions of said cleaning head.

9. The invention as in claim 1 wherein said cleaning element is a brush.

10. The invention as in claim 9 wherein said cleaning head includes a plurality of cleaning brushes each of which extends for engagement with said conveyor.

11. The invention as in claim 10 wherein said cleaning head includes a scraper disposed to engage said conveyor concomitantly with said brushes.

12. The invention as in claim 9 wherein each of said brushes is an elongated brush disposed transversely to said predetermined direction.

13. The invention as in claim 9 wherein each of said brushes is an elongated brush disposed to extend generally parallel to said predetermined direction.

14. The invention as in claim 1 wherein said head support is disposed to support said cleaning head in a generally horizontal plane beneath such a conveyor.

15. The invention as in claim 1 wherein said head support is disposed to support said cleaning head in a generally vertical plane beside such a conveyor.

16. The invention as in claim 1 wherein said head support is disposed with said engagement axis defining an angle less than about 45 degrees to said predetermined direction.

17. The invention as in claim 16 wherein said head support is disposed with said engagement axis parallel to said engagement axis.

18. The invention as in claim 1 wherein said conveyor is a generally flat belt, said supporting means supports said head support with said engagement axis parallel to said adjacent portion of said conveyor and to said predetermined direction.

19. A conveyor cleaning assembly comprising the combination of an endless conveyor which moves in a predetermined direction along a portion of its path of movement and a conveyor cleaning assembly, said cleaning assembly including:

a cleaning head which includes at least one cleaning element for engaging one or more surfaces of said conveyor and removing debris therefrom as said conveyor moves along said portion of its path in frictional engagement with said cleaning element, and a head support for holding said cleaning head in a fixed position adjacent to said conveyor along said portion of its path of movement, said head support having an engagement axis, means for supporting said head support in a predetermined position adjacent said portion of said path with said engagement axis generally parallel to said predetermined direction, said cleaning head and said head support being of complementary configurations for sliding engagement of said cleaning head with said head support upon movement of said cleaning head along said engagement axis generally in said predetermined direction of movement of such conveyor, said head support precluding movement of said cleaning head laterally relative to said engagement axis of said head support when so engaged therewith, and said cleaning head and said head support including abutment portions which limit the sliding engagement movement of said cleaning head onto said head support in said direction of movement of said conveyor, whereby said cleaning head may be so slid onto said head support and into a cleaning position for contact with said conveyor and thereafter will be retained in such cleaning position by friction forces of said conveyor acting on said cleaning head as said conveyor moves in said predetermined direction while in contact with said cleaning head and said cleaning head may be removed by sliding movement thereof opposite to said predetermined direction.

20. The invention as in claim 19 wherein said conveyor includes an endless conveyance belt that has an outer conveyance surface and an inner surface, said belt extending through a generally horizontal conveyance run wherein said belt receives product on its outer surface for conveyance thereon and a return run of said belt, and a support frame for said belt.

21. The invention as in claim 20 wherein said supporting means engages said frame and supports said head support thereon.

22. The invention as in claim 20 wherein said cleaning element engages said conveyance surface of said belt across substantially the full width of said belt.

23. The invention as in claim 20 wherein said conveyor belt includes a return run portion and said head support supports said cleaning head adjacent said return run portion with said cleaning element in engagement with said outer surface of said belt in said return run portion.

24. The invention as in claim 20 wherein the portion of said belt adjacent said cleaning head is generally planar and said supporting means supports said head support with said engagement axis substantially parallel to the plane of said adjacent portion of said belt and to said predetermined direction.

25. The invention as in claim 19 wherein said cleaning element is a brush formed of bristles having substantial length and includes supports disposed beside said bristles and positioned to allow independent lateral movement of the respective bristles while limiting the potential bending of the collective bristles forming the brush.

26. The invention as in claim 25 wherein said brush is detachably secured to other components of said cleaning head.

27. The invention as in claim 19 wherein said cleaning head includes a brush disposed to extend transversely of said belt and to engage said respective surface of said belt when said cleaning head is mounted on said head support.

28. The invention as in claim 19 wherein said cleaning head assembly comprises:

a base member for attachment to said head support adjacent such a conveyor belt;

a scraper mounted on said base and disposed to extend transversely to such a belt with an edge thereof in contact with an adjacent surface of said belt for scraping debris therefrom as said belt is advanced over said scraper;

at least one brush mounted on said base member and disposed to extend transversely of such a belt in a position rearward of said scraper, relative to advancement of said belt, and with the distal end of said brush in contact with the adjacent surface of said belt for further cleaning of said belt as it is advanced over said cleaning head.

29. The invention as in claim 28 wherein said brush is of a length to substantially span the width of said belt.

30. The invention as in claim 28 wherein said brush is formed of bristles having substantial length, and including supports disposed beside said bristles and positioned to allow independent lateral movement of the respective bristles while limiting the potential bending of the collective bristles forming the brush.

31. The invention as in claim 28 wherein said brush is detachably secured to other components of said cleaning head.

32. The invention as in claim 28 wherein said cleaning head includes a plurality of brushes disposed to extend transversely of said belt and to engage said respective surface of said belt.

* * * * *

UNITED STATES PATENT AND TRADEMARK OFFICE
CERTIFICATE OF CORRECTION

PATENT NO. : 5,746,302
DATED : May 5, 1998
INVENTOR(S) : John H. BOWMAN

It is certified that errors appear in the above-identified patent and that said Letters Patent is hereby corrected as shown below:

On the Title Page:

In Column 2, under OTHER PUBLICATIONS, insert the following reference:
--Finishing Coatings Manufacturing & Application, cover and p.51, November 1985. --.

Column 5, line 12: "welding This" should read --welding. This--.

In the Claims:

Claim 27, column 12, line 25: "19" should read --20--.

Claim 28, column 12, line 30: "19" should read --20--.

Signed and Sealed this

Fifth Day of September, 2000

Attest:

Q. TODD DICKINSON

Attesting Officer

*Director of Patents and Trademarks*